Patented Apr. 21, 1925.

1,534,962

UNITED STATES PATENT OFFICE.

ERMINIO JOSUÈ, OF ANCONA, ITALY, ASSIGNOR TO HIMSELF AND LORENZO VIOLINI, OF FALCONARA MARITTIMA, ITALY.

BRIQUETTE OF CHARCOAL AND PITCOAL.

No Drawing. Application filed September 24, 1924. Serial No. 739,710.

*To all whom it may concern:*

Be it known that I, ERMINIO JOSUÈ, manufacturer, a subject of the King of Italy and resident of Ancona, Italy, have invented certain new and useful Improvements in Briquettes of Charcoal and Pitcoal, of which the following is a specification.

The present invention relates to a pressed briquette of new composition for the rapid lighting of fire of furnaces, ovens, stoves, fireboxes and so on.

The briquette is composed of the following ingredients:

Charcoal 50 parts, pitcoal 50 parts, potassium chlorate 20 parts, gum arabic 35 parts, pitch in general 15 parts.

The two quantities of charcoal and pitcoal are first reduced to impalpable powder and at the same time a waterlike solution is prepared in which the potassium chlorate and gum arabic in the percentage mentioned are solved.

Solution and coaldust are then mixed together and when the coaldust is impregnated with said solution the whole is mixed with the pitch separately liquified. The paste obtained is then dried and reduced into powder with the object of getting a homogeneous mixture. The powder is then introduced into the moulds and compressed under a pressure of more atmospheres the briquettes being finally dried again at the temperature required natural or artificial, after which they are ready for use.

It is clear that the ingredients mentioned may be substituted by homologous products and the percentages indicated may be varied according to the degree of purity of the ingredients employed without trespassing the limits of protection of the invention.

Having now particularly described and ascertained my said invention and the manner in which the same is to be performed, which I claim and desire to secure by Letters Patent is:

A pressed briquette to light rapidly the fire of furnaces, forges, stoves, ovens, fireboxes and so on consisting of charcoal 50 parts, pitcoal 50 parts, potassium chlorate 20 parts, gum arabic 35 parts, pitch 15 parts, the two qualities of coal being first reduced into impalpable powder then mixed with a waterlike solution of potassium chlorate and gum arabic in the proportions indicated the mass being mixed with the pitch liquefied, the paste thus obtained being reduced into powder again, moulded, compressed under a pressure of several atmospheres and dried again.

In testimony whereof I have hereunto signed my name in the presence of two witnesses.

ERMINIO JOSUÈ.

Witnesses:
  MURTO VITTORIO,
  EHU L. GUBELI.